(12) United States Patent  (10) Patent No.: US 8,155,525 B2
Cox  (45) Date of Patent: Apr. 10, 2012

(54) POWER DISTRIBUTION DEVICES, SYSTEMS, AND METHODS FOR RADIO-OVER-FIBER (ROF) DISTRIBUTED COMMUNICATION

(75) Inventor: Terry D. Cox, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 494 days.

(21) Appl. No.: 12/466,514

(22) Filed: May 15, 2009

(65) Prior Publication Data

US 2010/0290787 A1   Nov. 18, 2010

(51) Int. Cl.
*H04B 10/00*   (2006.01)
(52) U.S. Cl. .................. 398/115; 398/116; 398/117
(58) Field of Classification Search .......... 398/115, 398/116, 117
See application file for complete search history.

(56) References Cited

U.S. PATENT DOCUMENTS

| 5,682,256 | A | 10/1997 | Motley et al. |
| 6,353,600 | B1 | 3/2002 | Schwartz et al. |
| 6,405,018 | B1 | 6/2002 | Reudink et al. |
| 6,496,290 | B1 | 12/2002 | Lee |
| 7,072,586 | B2 | 7/2006 | Aburakawa et al. |
| 2005/0226625 | A1 | 10/2005 | Wake et al. ............ 398/115 |
| 2008/0186143 | A1* | 8/2008 | George et al. ............ 340/10.3 |
| 2010/0054746 | A1* | 3/2010 | Logan ...................... 398/115 |

FOREIGN PATENT DOCUMENTS

| EP | 0924881 A2 | 6/1999 |
| EP | 1173034 A1 | 4/2001 |
| GB | 2275834 A | 9/1994 |
| WO | 0184760 A1 | 11/2001 |
| WO | WO2009/014710 A1 | 1/2009 |

OTHER PUBLICATIONS

Patent Cooperation Treaty, International Search Report for International Application No. PCT/US2010/034005, Aug. 12, 2010, 2 pages.

* cited by examiner

*Primary Examiner* — Kinam Park
(74) *Attorney, Agent, or Firm* — Christopher K. Montgomery

(57) ABSTRACT

Power distribution devices, systems and methods for a Radio-over-Fiber (RoF) distributed communication system are disclosed. In one embodiment, an interconnect unit is coupled between a head-end unit and one or more remote units. The interconnect unit includes a plurality of optical communication links each configured to carry RoF signals to and from a head-end unit to remote units. The RF electrical signals from the head-end unit are converted to RF optical signals and communicated over the optical communication links in the interconnect unit to the remote units. The remote units convert the optical signals to electrical signals and communicate the electrical signals to client devices. To provide power to the remote units, the interconnect unit electrically couples power from at least one power supply to a plurality of power branches. Each power branch is configured to supply power to a remote unit connected to the interconnect unit.

29 Claims, 7 Drawing Sheets

POWER DISTRIBUTION DEVICES, SYSTEMS, AND METHODS FOR RADIO-OVER-FIBER (ROF) DISTRIBUTED COMMUNICATION

TECHNICAL FIELD

The technology of the disclosure relates to providing power to remote units in a Radio-over-Fiber (RoF) distributed communication system.

BACKGROUND

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Wireless communication systems communicate with wireless devices called "clients," which must reside within the wireless range or "cell coverage area" in order to communicate with an access point device.

One approach to deploying a wireless communication system involves the use of "picocells." Picocells are radio-frequency (RF) coverage areas. Picocells can have a radius in the range from a few meters up to twenty meters as an example. Combining a number of access point devices creates an array of picocells that cover an area called a "picocellular coverage area." Because the picocell covers a small area, there are typically only a few users (clients) per picocell. This reduces the amount of RF bandwidth shared among the wireless system users.

"Radio-over-Fiber" (RoF) wireless systems can be used to create picocells. A RoF wireless system utilizes RF signals conveyed over optical fibers. Such systems include a head-end station optically coupled to a plurality of remote units. The remote units each include transponders that are coupled to the head-end station via an optical fiber link. The transponders in the remote units are transparent to the RF signals. The remote units simply convert incoming optical signals from the optical fiber link to electrical signals via optical-to-electrical (O/E) converters, which are then passed to the transponders. The transponders convert the electrical signals to electromagnetic signals via antennas coupled to the transponders in the remote units. The antennas also receive electromagnetic signals from clients in the cell coverage area and convert the electromagnetic signals to electrical signals. The remote units then convert the electrical signals to optical signals via electrical-to-optical (E/O) converters. The optical signals are then sent to the head-end station via the optical fiber link. Because the remote units include power consuming components, including O/E and E/O converters, electrical power must be provided to the remote units.

SUMMARY

Embodiments disclosed in the detailed description include power distribution devices, systems, and methods for Radio-over-Fiber (RoF) distributed communications. In one embodiment, an interconnect unit is coupled between a head-end unit and one or more remote units. The interconnect unit includes a plurality of optical communication links each configured to carry RoF signals between a head-end unit and a remote unit. To provide power to the remote units, the interconnect unit electrically couples power from at least one power supply to a plurality of power branches in the interconnect unit. Each power branch is configured to supply power to a remote unit when connected to the interconnect unit. In this manner, power is not required to be run from the heat-end unit to the remote units. Further, power supplies are not required in the remote units, would require additional space and also require each remote unit to be located in proximity to a power source, thus decreasing flexibility in placement in a building or other area.

In one embodiment, the electrical signals from the head-end unit are converted to optical signals and communicated over the optical communication links to the remote units via optical connections established in the interconnect unit. The remote units convert the optical signals to electrical signals and radiate the electrical signals via an antenna to client devices in the range of the antenna to provide a picocell. Each picocell from the remote units can be combined to form a picocell coverage area or areas for client device communications.

In another embodiment, the interconnect unit includes a bulk power supply that is configured to supply power to all remote units connected to the interconnect unit. In another embodiment, a plurality of power supplies are provided wherein power is partitioned from each power supply to a subset of remote units connected to the interconnect unit.

In another embodiment, a power distribution module is also provided in the interconnect unit to facilitate distribution of power to remote units connected to the interconnect unit. The power distribution module can be electrically coupled between a power supply and a plurality of power branches and configured to distribute power to a plurality of remote units. The power distribution module can provide one or more protection circuits to protect the interconnect unit and the remote units from damage caused by power irregularities or related power conditions, including power surges and electrostatic discharge (ESD) events as examples. In one embodiment, the power distribution module includes a voltage protection circuit. The voltage protection circuit may include an over-voltage protection circuit and/or a reverse-voltage protection circuit. In another embodiment, the power distribution module can include a current protection circuit. The current protection circuit can include an over-current protection circuit. An under-voltage sensing circuit and power level indicators may also be provided to indicate when the power level is not sufficient to properly operate the remote units.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include power distribution devices, systems, and methods for Radio-over-Fiber (RoF) distributed communications. In one embodiment, an interconnect unit is coupled between a head-end unit and one or more remote units. The interconnect unit includes a plurality of optical communication links each configured to carry RoF signals between a head-end unit and a remote unit. To provide power to the remote units, the interconnect unit electrically couples power from one or more power supplies to a plurality of power branches in the interconnect unit. Each power branch is configured to supply power to a remote unit when connected to the interconnect unit. In this manner, power is not required to be run from the head-end unit to the remote units. Further, power supplies are not required in the remote units, would require additional space and also require each remote unit to be located in proximity to a power source, thus decreasing flexibility in placement in a building or other area.

Figure 1:
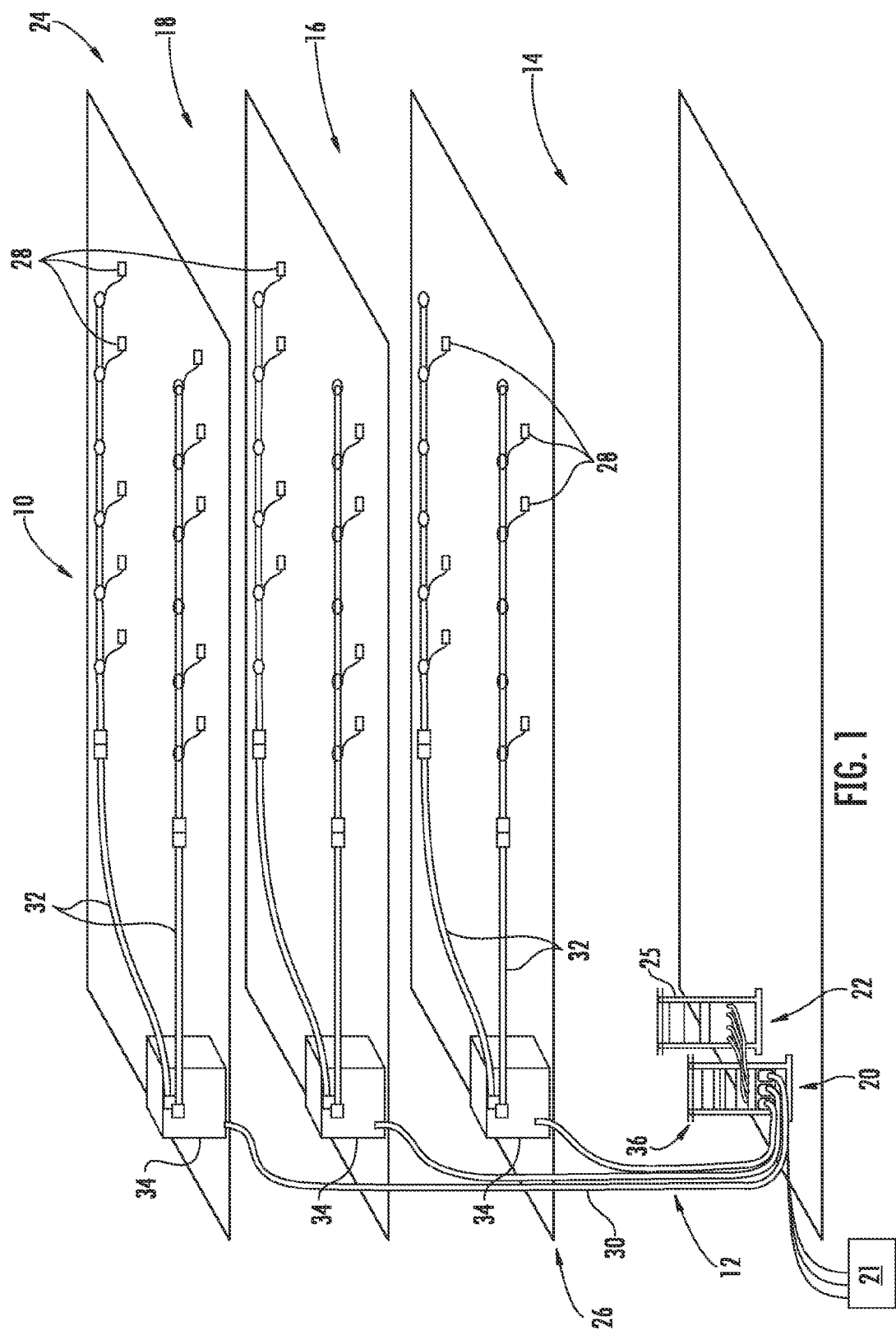
FIG. 1 is a schematic diagram of an exemplary Radio-over-Fiber (RoF) distributed communication system.

Although the embodiments of power distribution from interconnect units (ICUs) to remote units described herein can be used and employed in any type of RoF distributed communication system, an exemplary RoF distributed communication system 10 is provided in FIG. 1 to facilitate discussion of power distribution. FIG. 1 includes a partially schematic cut-away diagram of a building infrastructure 12 that generally represents any type of building in which the RoF distributed communication system 10 might be employed and used. The building infrastructure 12 includes a first (ground) floor 14, a second floor 16, and a third floor 13. The floors 14, 16, 18 are serviced by a head-end station or head-end unit (HEU) 20, through a main distribution frame 22, to provide a coverage area 24 in the building infrastructure 12. Only the ceilings of the floors 14, 16, 18 are shown in FIG. 1 for simplicity of illustration.

In an example embodiment, the HEU 20 is located within the building infrastructure 12, while in another example embodiment the HEU 20 may be located outside of the building infrastructure 12 at a remote location. A base transceiver station (BTS) 25, which may be provided by a second party such as a cellular service provider, is connected to the HEU 20, and can be co-located or located remotely from the HEU 20. In a typical cellular system, for example, a plurality of base transceiver stations are deployed at a plurality of remote locations to provide wireless telephone coverage. Each BTS serves a corresponding cell and when a mobile station enters the cell, the BTS communicates with the mobile station. Each BTS can include at least one radio transceiver for enabling communication with one or more subscriber units operating within the associated cell.

A main cable 26 is optically coupled to or includes multiple fiber optic cables 32 distributed throughout the building infrastructure 12, which are coupled to remote units 28 that provide the coverage area 24 for the first, second and third floors 14, 16, and 18. The remote units 28 may also be referred to as "remote antenna units." Each remote unit 28 in turn services its own coverage area in the coverage area 24. The main cable 26 can include a riser cable 30 that carries all of the uplink and downlink fiber optic cables 32 to and from the HEU 20. The main cable 26 can also include one or more multi-cable (MC) connectors adapted to connect select downlink and uplink optical fiber cables to a number of fiber optic cables 32. In this embodiment, an interconnect unit (ICU) 34 is provided for each floor 14, 16, 18, the ICUs 34 including a passive fiber interconnection of optical fiber cable ports which will be described in greater detail below. The fiber optic cables 32 can include matching connectors. In an example embodiment, the riser cable 30 includes a total of thirty-six (36) downlink and thirty-six (36) uplink optical fibers, while each of the six (6) fiber optic cables 32 carries six (6) downlink and six (6) uplink optical fibers to service six (6) remote units 28. Each fiber optic cable 32 is in turn connected to a plurality of remote units 28 each having an antenna that services a portion of the overall coverage area 24.

In this example embodiment, the HEUs 20 provide electrical radio-frequency (RF) service signals by passing (or conditioning and then passing) such signals from one or more outside networks 21 to the coverage area 24. The HEUs 20 are electrically coupled to an electrical-to-optical (E/O) converter 36 within the HEU 20 that receives electrical RF service signals from the one or more outside networks 21 and converts them to corresponding optical signals. The optical signals are transported over the riser cables 30 to the ICUs 34. The ICUs 34 may include passive fiber interconnection of optical fiber cable ports that pass the optical signals over the fiber optic cables 32 to the remote units 28 to provide the coverage area 24. In an example embodiment, the E/O converter 36 includes a laser suitable for delivering sufficient dynamic range for the RoF applications, and optionally includes a laser driver/amplifier electrically coupled to the laser. Examples of suitable lasers for the E/O converter 36 include laser diodes, distributed feedback (DFB) lasers, Fabry-Perot (FP) lasers, and vertical cavity surface emitting lasers (VCSELs).

The HEUs 20 are adapted to perform or to facilitate any one of a number of RoF applications, including but not limited to radio-frequency identification (RFID), wireless local area network (WLAN) communication, and/or cellular phone service. In a particular example embodiment, this includes providing WLAN signal distribution as specified in the IEEE 802.11 standard, i.e., in the frequency range from 2.4 to 2.5 GHz and from 5.0 to 6.0 GHz. In another example embodiment, the HEUs 20 provide electrical RF service signals by generating the signals directly. In yet another example embodiment, the HEUs 20 coordinate the delivery of the electrical RF service signals between client devices within the coverage area 24.

The number of optical fibers and fiber optic cables 32 can be varied to accommodate different applications, including the addition of second, third, or more HEUs 20. In this example, the RoF distributed communication system 10 incorporates multiple HEUs 20 to provide various types of wireless service to the coverage area 24. The HEUs 20 can be configured in a master/slave arrangement where one HEU 20 is the master and the other HEU 20 is a slave. Also, one or more than two HEUs 20 may be provided depending on desired configurations and the number of coverage area 24 cells desired.

Figure 2:
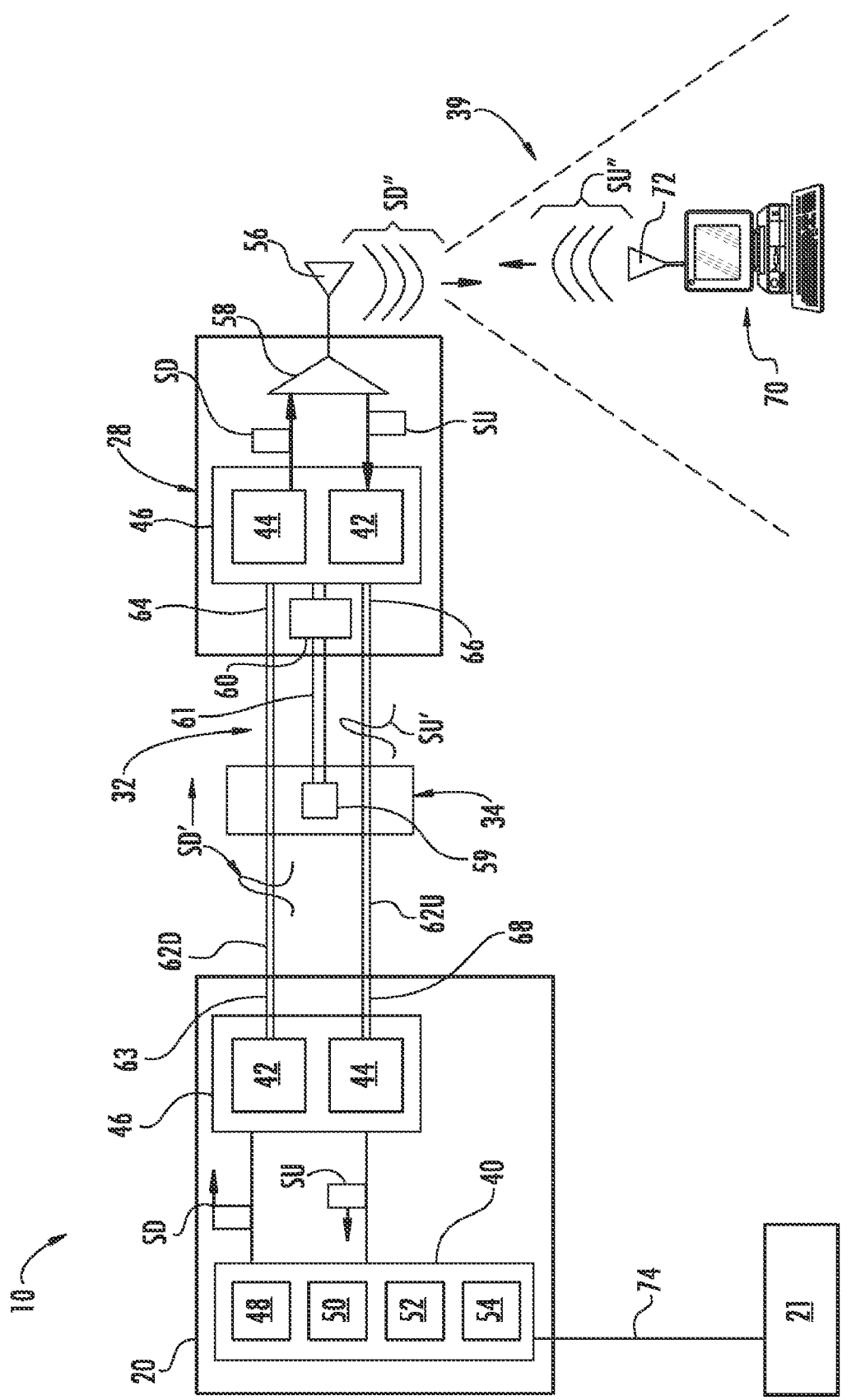
FIG. 2 is a schematic diagram of the head-end unit (HEU), interconnect unit (ICU), and one remote unit and picocell of the exemplary Radio-over-Fiber (RoF) distributed communication system of FIG. 1.

FIG. 2 is a schematic diagram of an example embodiment of the HEU 20 connected to one of the remote units 28 to facilitate further discussion of operational aspects of the RoF distributed communication system 10 of FIG. 1 The remote unit 28 creates a picocell 39 that together with other picocells 39 formed from other remote units 28, as illustrated in FIG. 1, provide the coverage area 24. The HEU 20 includes a service unit 40 that provides electrical RF service signals for a particular wireless service or application. In an example embodiment, the service unit 40 provides electrical RF service signals by passing (or conditioning and then passing) such signals from the one or more outside networks 21. The service unit 40 is electrically coupled to an electrical-to-optical (E/O) converter 42 that receives an electrical RF service signal from the service unit 40 and converts it to a corresponding optical signal. The HEU 20 also includes an optical-to-electrical (O/E) converter 44 electrically coupled to the service unit 40. The O/E converter 44 receives an optical RF service signal and converts it to a corresponding electrical signal. In an example embodiment, the O/E converter 44 is a photodetector, or a photodetector electrically coupled to a linear amplifier. The E/O converter 42 and the O/E converter 44 constitute a "converter pair" 46.

In an example embodiment, the service unit 40 includes an RF signal modulator/demodulator unit 48 that generates an RF carrier of a given frequency and then modulates RF signals onto the carrier. The RF signal modulator/demodulator unit 48 also demodulates received RF signals. The service unit 40 also includes a digital signal processing unit ("digital signal processor") 50, a central processing unit (CPU) 52 for processing data and otherwise performing logic and computing operations, and a memory unit 54 for storing data, such as system settings and status information, RFID tag information, etc. In an example embodiment, the different frequencies associated with the different signal channels are created by the RF signal modulator/demodulator unit 48 generating different RF carrier frequencies based on instructions from the CPU 52. Also, as described below, the common frequencies associated with a particular combined picocell are created by the RF signal modulator/demodulator unit 48 generating the same RF carrier frequency.

With continuing reference to FIG. 2, in an example embodiment, the fiber optic cable 32 from the converter pair 46 in the HEU 20 is connected to the ICU 34. The ICU 34 provides a passive connection of the optical signals from the HEU 20 to the remote unit 28, as will be described below. The remote unit 28 also includes a converter pair 46, wherein the E/O converter 42 and the O/E converter 44 therein are electrically coupled to an antenna system 56 via an RF signal-directing element 58, such as a circulator. Because the converter pair 46 in the remote unit 28 requires power to operate, a power distribution module 59 is also provided in the ICU 34 to distribute power to the remote unit 28 and any other remote units 28 connected to the ICU 34. Power is required to power the converter pair 46 and/or other power-consuming components in the remote unit 28. According to one aspect of the present embodiment, providing power to the remote units 28 from the ICU 34 prevents the need for each remote unit 28 to provide a power supply thus saving cost and reducing the size of the remote units 28. Further, the remote unit 28 may not be in sufficient proximity to a power source to be placed such that the picocell 39 is in the desired area. Providing power from the HEU 20 would require providing power either in separate cables or within the riser cables 30, which would require the HEU 20 to provide sufficient power for all possible remote units 28 adding complexity and cost.

In this embodiment, a DC power converter 60 is electrically coupled to the converter pair 46 in the remote unit 28, and changes the voltage or levels of an electrical power signal generated by a power supply 100 (FIG. 3) and provided over electrical power lines 61 to the power level(s) required by the power-consuming components in the remote unit 28. In an example embodiment, the DC power converter 60 is either a DC/DC power converter, or an AC/DC power converter, depending on the type of electrical power signal carried by the electrical power line 61. In an example embodiment, the electrical power line 61 includes standard electrical-power-carrying electrical wire(s), e.g., 18-26 AWG (American Wire Gauge) used in standard telecommunications and other applications. More detail regarding an exemplary power distribution module 59 that can be provided in the ICU 34 is described in more detail below starting with FIG. 3.

Turning back to FIG. 2, the RF signal-directing element 58 serves to direct the downlink and uplink electrical RF service signals. In an example embodiment, the antenna system 56 includes one or more patch antennas, such as disclosed in U.S. Patent Application Publication No. 2008/0044186, published on Feb. 21, 2008, which patent application is incorporated herein by reference. The remote unit 28 in this embodiment has few signal-conditioning elements and no digital information processing capability. Rather, the information processing capability is located remotely in the HEU 20, and in a particular example, in the service unit 40. This allows the remote unit 28 to be very compact and virtually maintenance-free. In addition, the preferred example embodiment of the remote unit 28 consumes very little power, is transparent to RF signals, and does not require a local power source, as will be described in more detail below.

With reference again to FIG. 2, the fiber optic cable 32 includes a downlink optical fiber 62D having an input end 63 and an output end 64, and an uplink optical fiber 62U having an input end 66 and an output end 68. The downlink and uplink optical fibers 62D and 62U optically couple the converter pair 46 in the HEU 20 to the converter pair 46 in the remote unit 28. Specifically, the downlink optical fiber input end 63 is optically coupled to the E/O converter 42 of the HEU 20, while the output end 64 is optically coupled to the O/E converter 44 of the remote unit 28. Similarly, the uplink optical fiber input end 66 is optically coupled to E/O converter 42 of the remote unit 28, while the output end 68 is optically coupled to the O/E converter 44 of the HEU 20. In an example embodiment, the RoF distributed communication system 10 employs a known telecommunications wavelength, such as 850 nm, 1300 nm, or 1550 nm as examples. In another example embodiment, the RoF distributed communication system 10 employs other less common but suitable wavelengths, such as 980 nm as an example.

With reference to the RoF distributed communication system 10 of FIG. 1 and FIG. 2, the service unit 40 generates an electrical downlink RF service signal SD ("electrical signal SD") corresponding to its particular application. In an example embodiment, this is accomplished by the digital signal processor 50 providing the RF signal modulator/demodulator unit 48 with an electrical signal (not shown) that is modulated onto an RF carrier to generate a desired electrical signal SD. The electrical signal SD is received by the E/O converter 42 in the HEU 20, which converts this electrical signal SD into a corresponding optical downlink RF signal SD' ("optical signal SD'"), which is then coupled into the downlink optical fiber 62D at the input end 63. The optical signal SD' is tailored to have a given modulation index. The modulation power of the E/O converter 42 is controlled (e.g., by one or more gain-control amplifiers, not shown) to vary the transmission power from the antenna system 56. In an example embodiment, the amount of power provided to the antenna system 56 is varied to define the size of the associated picocell 39.

The optical signal SD' travels over the downlink optical fiber 62D to the output end 64, where it is received by the O/E converter 44 in the remote unit 28. The O/E converter 44 converts the optical signal SD' back into electrical signal SD, which then travels to the RF signal-directing element 58. The RF signal-directing element 58 then directs the electrical signal SD to the antenna system 56. The electrical signal SD is fed to the antenna system 56, causing it to radiate a corresponding electromagnetic downlink RF signal SD" ("electromagnetic signal SD'"") according to the radiation pattern of the antenna system 56 to provide the picocell 39. A client device 70, and more particular a client device antenna 72 associated with the client device 70, can receive the electromagnetic signal SD" when present in the picocell 39. The client device antenna 72 may be part of a wireless card or a cell phone antenna, as examples. The client device antenna 72 converts the electromagnetic signal SD" into an electrical signal SD in the client device 70 (signal SD is not shown therein).

The client device 70 can generate electrical uplink RF signals SU (not shown in the client device 70), which are converted into electromagnetic uplink RF signals SU" ("electromagnetic signal SU'"") by the client device antenna 72. The electrical signal SU is directed by the RF signal-directing element 58 to the E/O converter 42 in the remote unit 28, which converts this electrical signal SU into a corresponding optical uplink RF signal SU' ("optical signal SU'"), which is then coupled into the input end 66 of the uplink optical fiber 62U. The optical signal SU' travels over the uplink optical fiber 62U to the output end 68, where it is received by the O/E converter 44 in the HEU 20. The O/E converter 44 converts the optical signal SU' back into electrical signal SU, which is then directed to the service unit 40. The service unit 40 receives and processes the electrical signal SU, which in an example embodiment includes one or more of the following: storing the signal information; digitally processing or conditioning the signals; sending the signals to one or more outside networks 21 via network links 74; and sending the signals to one or more client devices 70 in the coverage area 24. In an example embodiment, the processing of electrical signal SU includes demodulating this electrical signal in the RF signal modulator/demodulator unit 48, and then processing the demodulated signal in the digital signal processor 50.

Figure 3:
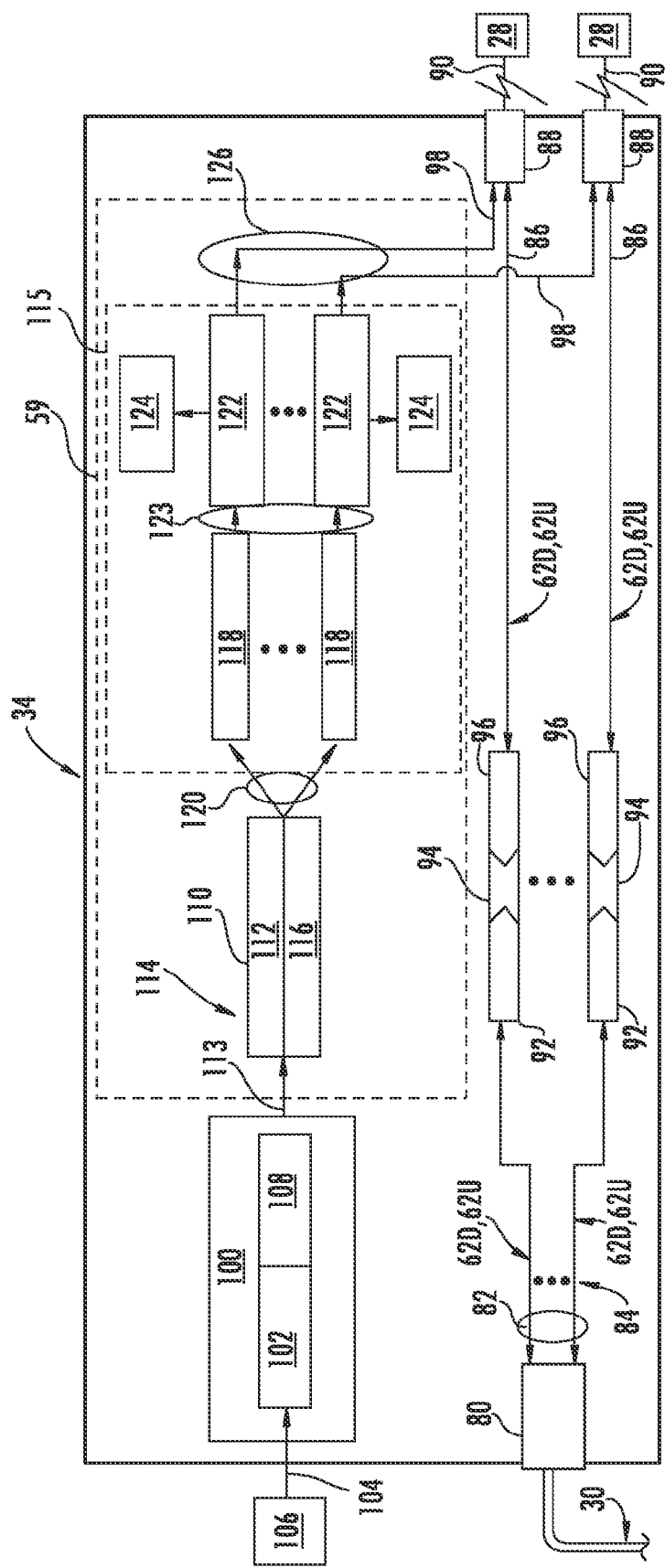
FIG. 3 is a schematic diagram of the exemplary ICU and power distribution module of FIGS. 1 and 2.

FIG. 3 is a schematic diagram illustrating more detail regarding the exemplary ICU 34 in the RoF distributed communication system 10 of FIGS. 1 and 2. To provide the optical connections between optical fibers in the riser cable 30 and the remote units 28, a furcation 80 from the riser cable 30 connected to the HEU 20 is brought to the ICU 34. The furcation 80 breaks pairs of optical fibers 82 from the riser cable 30 into optical communication input links. The optical communication input links in this embodiment are downlink and uplink optical fibers 62D, 62U configured to be connected to the remote units 28. The downlink optical fiber 62D carries RoF signals from the HEU 20 to the remote units 28, and the uplink optical fiber 62U carries RoF signals from the remote units 28 to the HEU 20. The furcation 80 contains at least two optical fibers 82 in one or more furcated legs 84 to provide at least one downlink and uplink optical fiber 62D, 62U pair to allow the ICU 34 to service one remote unit 28. However, more than one pair of optical fibers 82 may be provided by the furcation 80 to allow the ICU 34 to service more than one remote unit 28. A pair of downlink and uplink optical fibers 62D, 62U is provided for each remote unit 28 serviced by the ICU 34. Each of the downlink and uplink optical fibers 62D, 62U may be provided in one furcation 80 as illustrated in FIG. 3, or in multiple furcations brought to the ICU 34.

To complete the connection of the downlink and uplink optical fibers 62D, 62U to the remote units 28, the furcated legs 84 are connected to optical fibers in furcated legs 86. The furcated legs 86 are provided from furcations 88 of fiber optic cables 90 from the remote units 28 to provide optical communication output links. In this embodiment, the ICU 34 is configured to service up to six (6) remote units 28. The furcated legs 84 may be pre-connectorized with a fiber optic connector 92 to facilitate easy connections within the ICU 34. The fiber optic connectors 92 can be connected to fiber optic adapters 94 which receive fiber optic connectors 96 from preconnectorized furcated legs 86 to complete the optical connection between the downlink and uplink optical fibers in the remote units 28 to the optical fibers 82 in the riser cable 30 from the HEU 20. Other methods of connecting the optical fibers 82 to the remote units 28, including but not limited to splicing and the providing of splices and/or splice trays in the ICU 34, are also possible.

As previously stated, the remote units 28 contain power-consuming components that must be powered for the remote unit 28 to properly operate. In this regard in this exemplary embodiment, the fiber optic cables 90 contain electrical conductors, namely two conductors for power and ground in this example, that allow power to be distributed through the fiber optic cables 90 to multiple remote units 28. The fiber optic cables 90 may be hybrid cables that contain both optical fibers and electrical conductors as shown FIG. 3, or the electrical conductors could be run through separate wiring or cabling to the remote units 28 if desired. In this exemplary embodiment, the furcations 88 provide electrical furcated legs 98 that are configured to receive power. The electrical furcated legs 98 are electrically coupled to a power distribution module 59 which receives power from a power supply 100 to provide power to the remote units 28. By providing the power supply 100 and the power distribution module 59 in the ICU 34, power sources do not have to be provided in the remote units 28, nor do the remote units 28 have to be located within reach of power sources. Further, the HEU 20 does not have to provide power supplies and associated electrical cabling to power the remote units 28. The power supply 100 associated with the ICU 34 can distribute power to multiple remote units 28.

In this embodiment, the power supply 100 is located within the ICU 34, but could also be located outside of the ICU 34. The power supply 100 may also be an uninterruptable power supply. The power supply 100, which may be also referred to as a bulk power supply 100, provides DC power to the remote units 28 in this embodiment. The power supply 100 receives either AC or DC power into a power input 102. The power input 102 may receive 110V to 240V AC or DC power from a power line 104 connected to a power source 106 as an example. In one embodiment, a transformer (not shown) converts AC power from the power input 102 to DC power on a power output 108. For example, the AC/DC transformer could transform 110V-240V alternating current (AC) power that is readily available in the building infrastructure 12 into DC power for distribution by the power distribution module 59 to the remote units 28. An another example, a DC/DC converter could be provided in the power supply 100 to convert DC power on the power input 102 to DC power on the power output 108. The power from the power supply 100 is split to each of the remote units 28 as will be described in more detail below.

The power supply 100 can be provided to produce any voltage level of DC power desired. In one embodiment, the power supply 100 can produce relatively low voltage DC current to the electrical power lines 61. Likewise, the power distribution module 59 can support distributing the low voltage DC power provided by the power supply 100 to the electrical conductors in the electrical power lines 61 for powering the remote units 28. In this example, the power output 108 is a low voltage of approximately forty-eight (48) volts DC or less, and may be in the range of twenty-four to forty-eight (48) Volts DC. A low voltage may be desired so that the ICU 34 is power-limited and Safety Extra Low Voltage (SELV) compliant, although such is not required. For example, according to Underwriters Laboratories (UL) Publication No. 69060, SELV-compliant circuits produce voltages that are safe to touch both under normal operating conditions and after faults. The voltage between any two conductors and between any one conductor and ground (i.e., earth) should not exceed 60V DC and 42.4 Volts peak under normal operating conditions. The total power for a SELV compliant power supply is limited to approximately 100 VA. Article 725 of the National Electric Code (NEC) provides for power-limited circuits. The 100 VA limit discussed therein is for a Class 2 DC power source, as shown in Table 11(B) in Article 725. Providing a SELV compliant power supply 100 and ICU 34 may be desired or necessary for fire protection and to meet fire protection and other safety regulations and/or standards. Further, since operations may frequently interact with the ICU 34 and the connections provided therein during installation and configurations of the ICU 34 and the optical connections provided therein between the optical fibers in the riser cable 30 and the remote units 28, providing a power supply 100 that produces a SELV may be desired to avoid accidental shocks or electrocutions.

It may further be desired to provide additional power management features in the power distribution module 59 before the power from the power supply 100 is transferred from the ICU 34 to the remote units 28. For example, as illustrated in FIG. 3, the power distribution module 59 can include one or more voltage protection circuits 110. For example, an over-voltage protection circuit 112 may be provided in the power distribution module 59 that is coupled to input power lines 113 from the power supply 100 to prevent power surges from damaging equipment or circuits within the ICU 34 and at the remote units 28. The over-voltage protection circuit 112 redirects power from the power supply 100 away from power branches 115 in the power distribution module 59 if an over-voltage condition is detected. By example only, the over-voltage protection circuit 112 may be designed to redirect power if the voltage level is greater than five to fifty percent (5-50%) above the nominal voltage level for the power supply 100. Providing over-voltage protection also protects against surges due to electrostatic discharge (ESD) events which may occur due to discharges by the power supply 100, such as due to malfunctions, electrostatic energy present in areas surrounding the power supply 100 and/or the ICU 34, and/or from technician intervention, such as if a technician is not properly grounded when servicing the ICU 34.

In this embodiment, as illustrated in FIG. 3, the over-voltage protection module 112 is located in the power distribution module 59 in a common branch 114 prior to the power being split and distributed among power branches 115 that are electrically coupled to the remote unit 28. The voltage level is split to each of the power branches 115 in parallel, so voltage levels in each of the power branches 115 is the same or essentially the same. Thus, it is not necessary to protect each individual power branch 115 from an over-voltage condition. An over-voltage condition, if present, would be present in each of the power branches 115 without distinction. However, the over-voltage protection circuit 112 could be provided in each power branch 115 if desired, but such would likely incur additional costs. More discussion regarding an exemplary embodiment of the over-voltage protection circuit 112 is described below with regard to FIG. 4.

It may also further be desired to provide reverse-voltage protection in the power distribution module 59 to protect against a reverse-voltage condition. Reverse-voltage protection prevents a reverse polarity (i.e., a negative voltage) in voltage from being supplied by the power supply 100, which could otherwise damage components in the power distribution module 59 and at the remote units 28. For example, a technician may accidentally reverse power and ground lines or leads in the input power lines 113 leading from the power supply 100 to the power distribution module 59. Certain components in the power distribution module 59 and/or the remote unit 28 may be damaged if a reverse-voltage is applied to certain of their components. In this regard, a reverse-voltage protection circuit 116 may be provided in the power distribution module 59 that is coupled to the input power lines 113 from the power supply 100. The reverse-voltage protection circuit 116 redirects power from the power supply 100 away from the power branches 115 if a reverse voltage condition is detected. For example, the reverse-voltage protection circuit 116 may redirect power if the voltage level produced by the power supply 100 reaches 0.3 to 5.0 V.

In this embodiment, as illustrated in FIG. 3, the reverse-voltage protection module 116 is located in the power distribution module 59 in the common branch 114 prior to the power being split and distributed among power branches 115 that are electrically coupled to the remote unit 28. A reverse-voltage condition, if present, would be present in each of the power branches 115 without distinction. However, the reverse-voltage protection circuit 116 could be provided in each power branch 115 if desired. More discussion regarding an exemplary embodiment of the reverse-voltage protection circuit 116 is described below with regard to FIG. 4.

Within each power branch 115, current protection and other power detection and related circuits may be provided. In the embodiment in FIG. 3, the power supply 100 is power enough to supply power to all remote units 28 connected to the ICU 34. Thus, the power supply 100 is powerful enough to produce an over-current condition in a power branch 115 if a power splitting malfunction occurs. In this regard and in this embodiment as illustrated in FIG. 3, over-current protection circuits 118 may be provided in each power branch 115. In this embodiment, the ICU 34 is configured to support up to six (6) remote units 28, and thus six (6) over-current protection circuits 118 are provided, although such is not required or limiting. The over-current protection circuits 118 are electrically coupled to split power outputs 120 from the voltage protection circuit(s) 110 in this embodiment. The over-current protection circuits 118 protect the components in the ICU 34 and the remote units 28 from being damaged due to an over-current condition generated by the power supply 100 or other cause, such as an unintended short circuit in the power distribution module 59 for example.

Unlike the voltage protection circuits 110, the over-current protection circuits 118 are included in the individual power branches 115 since current level can differ among the power branches 115. By placing the over-current protection circuits 118 in each power branch 114, over-current conditions present in a particular power branch 115 can be isolated. However, the over-current protection circuit 118 could be placed in a common branch 114 if desired. As an example, the over-current protection circuits 118 may be designed to detect if the current level is at least approximately five to two hundred percent (5-200%) above nominal current levels in a power branch 115. More discussion regarding an exemplary embodiment of the over-current protection circuits 118 is described below with regard to FIGS. 4 and 5.

It may also be desired to provide an under-voltage sensing circuit 122 in the power distribution module 59. An under-voltage level (but not meaning reverse voltage) typically will not damage components in the ICU 34 and the remote units 28. However, under-voltage conditions can cause the ICU 34 and/or the remote units 28 to not properly operate. Some circuits and components, including those that may be provided in the power branches 115 of the ICU 34 and in the remote units 28, require a minimum operation voltage to properly operate. If the voltage level produced by the power supply 100 is insufficient, a remote unit 28 may not properly operate and may go offline, meaning that the remote unit 28 may not send and receive RF signals to a client device 70 (see FIG. 2). Thus, sensing under-voltage conditions can assist in troubleshooting the ICU 34 and the power supply 100 and/or power distribution module 59.

The under-voltage sensing circuits 122 are electrically coupled to outputs 123 of the under-current protection circuits 118 in this embodiment, as illustrated in FIG. 3. The under-voltage sensing circuits 122 are located on the remote unit 28 side of the power distribution module 59 so that any over-voltage, reverse-voltage, and/or over-current protections are provided before the power reaches the under-voltage sensing circuits 122 in this embodiment. The under-voltage sensing circuits 122 require power from the power supply 100 to operate in this embodiment. Further, it may be desired to detect the power levels in each of the power branches 115 individually. Thus, since the ICU 34 is configured to support up to six (6) remote units 28 in this embodiment, six (6) under-voltage power sensing circuits 122 are provided, although such is not required or limiting.

If a remote unit 28 is not properly operating, a technician may be dispatched to diagnose the problem. If the problem is a result of an insufficient or under-voltage provided by the power supply 100, the under-voltage sensing circuit 122 can indicate to the technician that an insufficient voltage level is being produced by the power supply 100. The power distribution module 59 may include power level indicators 124 that are electrically coupled to each under-voltage sensing circuit 122 to provide an indication of the power level in the power distribution module 59 to a technician or other device. As an example, the power level indicators 124 may have a visual indicator, such as one or more light emitting diodes (LEDs) as an example, indicative of the voltage level or an under-voltage condition in the ICU 34. If the power level is insufficient as a result of any power level condition, including an under-voltage condition, corrective measures can be taken, such as diagnosing the power connections in the ICU 34 as an example, and replacing the power supply 100, if needed. More discussion regarding an exemplary embodiment of the under-voltage sensing circuits 122 is described below with regard to FIGS. 4 and 5.

Unless the over-voltage protection circuit 112, the reverse-voltage protection circuit 116, and/or the over-current protection circuits 118 redirect power, the power distribution module 59 transfers the received power from the power supply 100 to the power output lines 126. To couple the power to the remote units 28 in this embodiment, the power output lines 126 are electrically coupled to the electrical furcated legs 98, which are run to each of the remote units 28. The power output lines 126 may be separate power lines that are electrically connected to the electrical furcated legs 98, or the electrical furcated legs 98 for each of the remote units 28 may be directly connected to over-voltage protection circuits 112.

Figure 4:
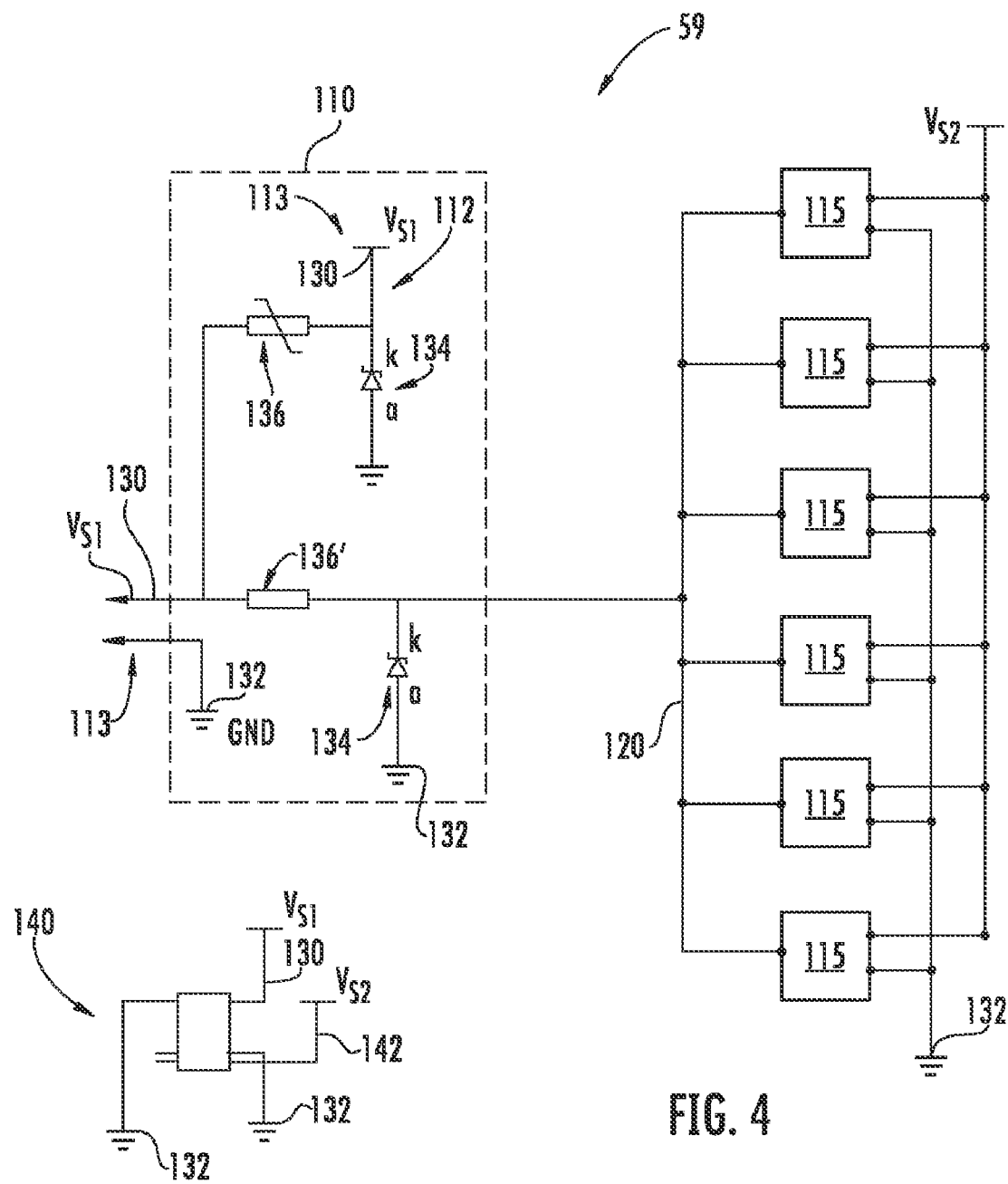
FIG. 4 is a schematic diagram of an exemplary voltage protection circuit of the power distribution module of FIG. 3.

FIG. 4 illustrates a schematic diagram of the power distribution module 59 in FIG. 3 illustrating more details regarding the circuit and the components contained therein for this embodiment. As illustrated in FIG. 4, the input power lines 113 come from the power supply 100 into the power distribution module 59. The positive input power line 113 is coupled to a $V_{S1}$ node 130 and a ground (GND) node 132. The voltage protection circuit 110 is provided in this embodiment by the $V_{S1}$ node 130 being coupled to a cathode k of a diode 134 configured in a reverse bias mode. The anode 'a' of the diode 134 is coupled to the GND node 132. A fuse 136 is also coupled to the cathode 'k' of the diode 134 in this embodiment. During normal voltage levels, the diode 134 is an open circuit. Current flows through the fuse 136 and the voltage level is applied in parallel on each of the power outputs 120 to each of the power branches 115 as illustrated in FIG. 3.

When the voltage level supplied from the power supply 100 at the $V_{S1}$ node 130 rises above an excess voltage level approximately equal to the activation voltage drop level in order to activate or "turn-on" the diode 134, the diode 134 will become a short circuit to shunt excess current to the GND node 132. This directs power from the power supply 100 away from the remainder of the components in the power branches 115 of the power distribution module 59 (as illustrated in FIG. 3) and protects the remote units 28 from an over-voltage condition. Also, the fuse 136 becomes an open circuit in response to the over-current draw from the power supply 100 as a result of the short circuit operation of the diode 134 to provide a current limiting function to protect the diode 134. Further, because the diode 134 is provided in a reverse bias mode, the diode 134 will also short to the GND node 124 when a negative voltage is applied across the $V_{S1}$ and GND nodes 130, 132. Thus, in this example, the over-voltage protection circuit 112 and the reverse-voltage protection circuit 116 are provided as part of the same circuit, although such is not required.

In this embodiment, the diode 134 is a transient voltage suppression (TVS) diode. A TVS diode can be used to protect sensitive electronics from voltage spikes. A TVS diode is similar to a Zener diode in that it permits current in the forward direction like a normal diode, but also in the reverse direction if the voltage is larger than a breakdown voltage. Thus, a TVS diode can be used to protect for both over-voltage and reverse-voltage conditions. However, any type of over-voltage protection device may be employed. In this embodiment, the fuse 136 is a power temperature coefficient (PTC) fuse which is resettable to provide a short circuit for normal operation when the current drawn from the power supply 100 lowers beyond the current limiting threshold of the PTC fuse. However, any type of over-current protection device may be employed. A resettable fuse may be desirable to prevent the fuse from having to be manually replaced.

Further, in this embodiment, a second diode 134' and resettable fuse 136' are provided in parallel and coupled to the $V_{S1}$ node 130 and the GND node 132. The second diode 134' and resettable fuse 136' partition the over-voltage and reverse-voltage protection between the two diodes 134, 134' and the current limiting over the two fuses 136, 136' to narrow the required current voltage and current limiting range of the diodes 134, 134' and the fuses 136, 136', respectively. However, only one partition or more than two partitions may be provided as desired.

The power distribution module 59 in this embodiment also includes a DC-to-DC converter 140 to provide a second voltage at $V_{S2}$ node 142 from the voltage provided by the power supply 100 at the $V_{S1}$ node 130. In this example, the voltage level provided by the power supply 100 at the $V_{S1}$ node 130 is approximately 48V. The DC-to-DC converter 140 is configured to transform this 48V to approximately 5V at the $V_{S2}$ node 142. This is so a lower voltage can be used to provide power to the under-voltage sensing circuits 122 and power level indicators 124 in the power distribution module 59 that require approximately 5V in this example.

Figure 5:
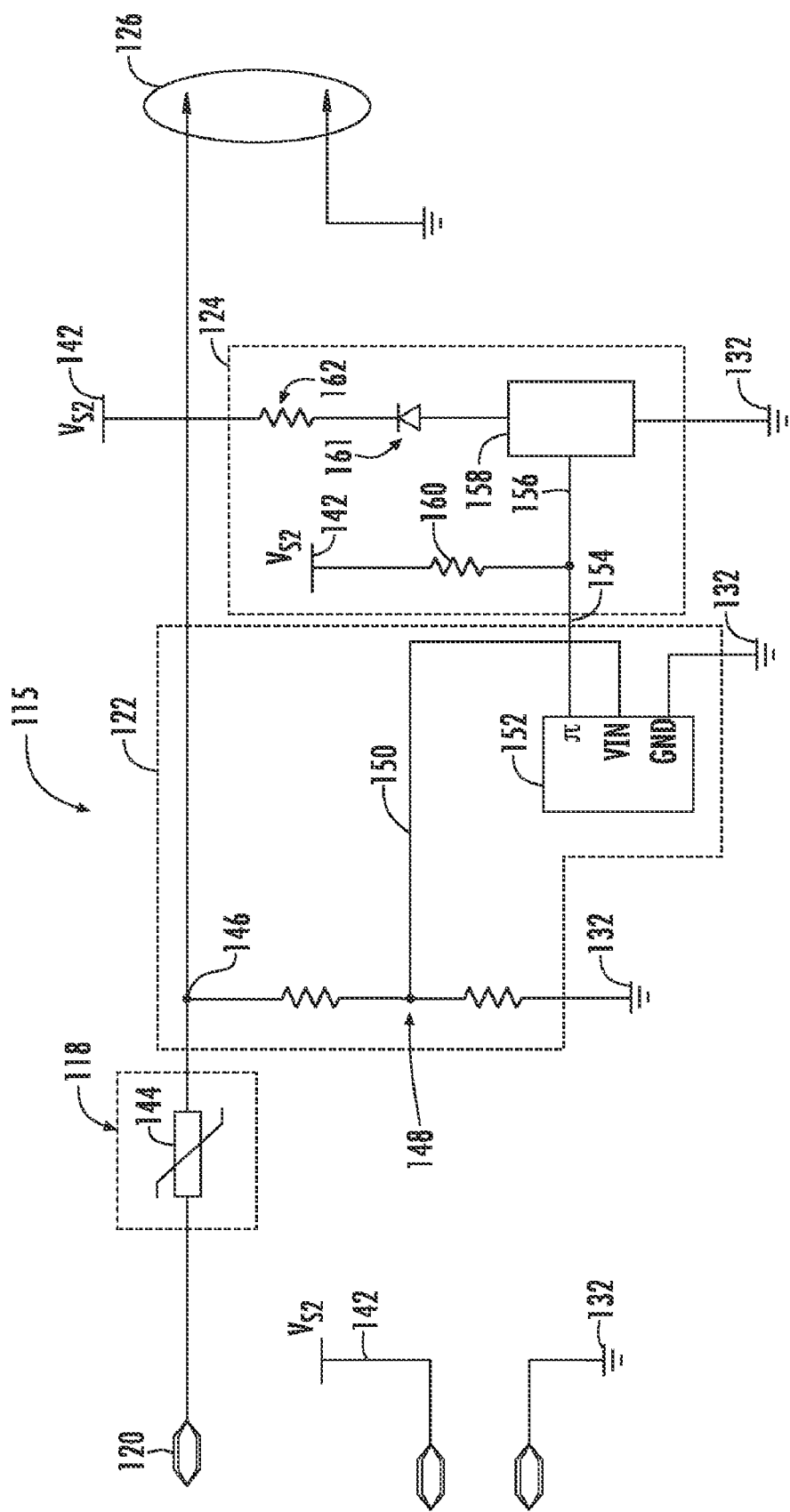
FIG. 5 is a schematic diagram of an exemplary current protection circuit and an exemplary under-voltage sensing modules of the power distribution module of FIG. 3.

FIG. 5 illustrates an over-current protection circuit 118 and under-voltage sensing circuit 122 in one power branch 115 of the power distribution module 59 of FIG. 3. It is understood that the illustrated over-current protection circuit 118 and under-voltage sensing circuit 122 in FIG. 5 may be provided in each of the power branches 115 in the power distribution module 59, but for simplicity of illustration and discussion purposes, only one over-current protection circuit 118 and under-voltage sensing circuit 122 for one power branch 115 is illustrated in FIG. 5. The discussion here is equally applicable for all other power branches 115 of the power distribution module 59.

As illustrated in FIG. 5, the over-current protection circuit 118 is provided in the form of a fuse 144 in this embodiment. The fuse 144 provides an open circuit if the current exceeds a designed current level according to the type and characteristics of the fuse 144. In this embodiment, the fuse 144 is a PTC resettable fuse. The fuse 144 resets when the current level lowers beyond the over-current condition. During normal current conditions or once the fuse 144 resets after an over-current condition, the current flows to an output node 146 of the fuse 144, which is coupled to the power output lines 126 electrically coupled to the remote units 28 to provide power to the remote units 28. To output node 146 of the fuse 144 is also coupled in parallel to the under-voltage sensing circuit 122 and power level indicator 124 in this embodiment, as illustrated in FIG. 5. The under-voltage sensing circuit 122 monitors the voltage level and does not redirect power.

The output node 146 is coupled to a resistor divider network 148 to provide a ratio of the voltage level to a node 150 that is input into an input voltage pin (VIN) in a voltage comparator 152. In this embodiment, the voltage comparator 152 is an integrated circuit (IC) provided in an IC chip. For example, the voltage comparator 152 may be the MC33064 under-voltage sensing integrated circuit IC. The reference voltage is set in an internal circuit in the voltage comparator 152 in this embodiment. However, any type of voltage comparator 152 may be provided. If the voltage level on the node 150 drops below a reference voltage level setting in the voltage comparator 150, the voltage comparator 152 pulls a reset line 154 to a low or zero voltage. The reset line 154 is coupled to an input 156 of a switch 158, which may be a transistor, including but not limited to a field effect transistor (FET), or any other type of transistor. A pull-up resistor 160 is coupled between the $V_{S2}$ node 142 and the reset line 154 to provide a bias voltage to the switch 158. If the switch 158 is activated by the reset line 154 being pulled low, the switch 158 activates or turns on to provide a current flow path between the $V_{S2}$ node 142 and the GND node 132. Current flows through an LED 161 to emit light to indicate the under-voltage condition to a technician. A current-limiting resistor 162 protects the LED 161 from an over-current condition.

Depending on the environmental conditions, the power supply 100 associated with the ICU 34 may behave differently at reduced conditions. For example, at higher temperatures, the output wattage of the power supply 100 described above and illustrated in FIG. 3 can be reduced from approximately 180 W (e.g., at room temperature) to 140 W (i.e., at higher temperatures) under maximum loads. This reduction in power may not be sufficient to properly power the remote units 28 depending on the number of remote units 28 connected to the ICU 34. For example, in the ICU 34 example in FIG. 3, the remote units 28 may require approximately 36-40 W of power for a total of between 144 W-150 W. However, at elevated temperatures, the power supply 100 may be unable to provide this power to each power branch 115 in the power distribution module 59. Selecting a power supply 100 with a higher power rating to compensate for reduction in power due to reduced conditions may not be possible in order to comply with low voltage requirements previously described. Additional cooling devices, such as fans or heat sinks, may also be required, adding cost to the ICU 34.

Figure 6:
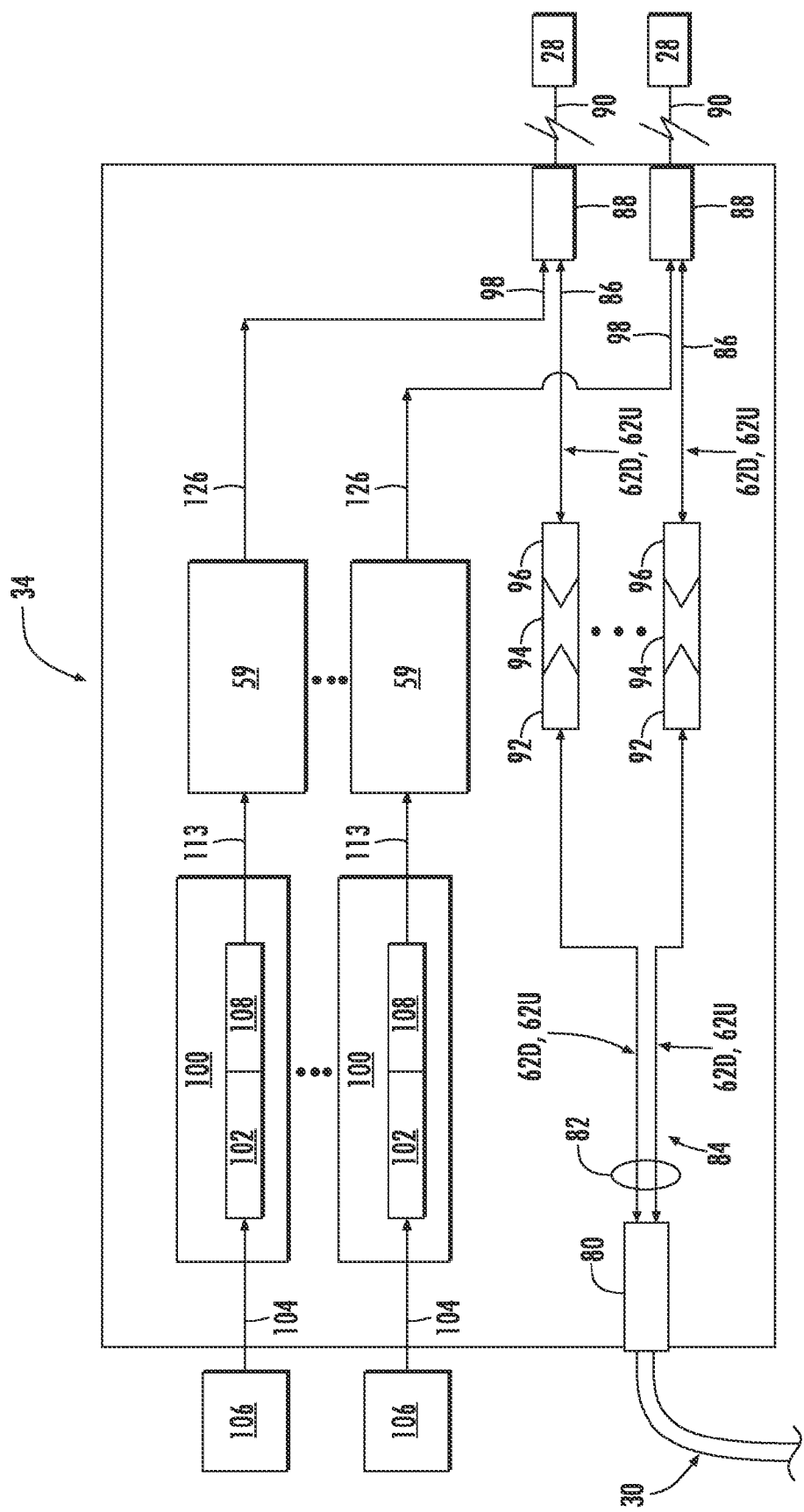
FIG. 6 is a schematic diagram of an alternative exemplary ICU and power distribution modules that can be employed in the exemplary Radio-over-Fiber (RoF) distributed communication system of FIGS. 1 and 2.

In this regard, FIG. 6 illustrates an alternate embodiment of the ICU 34 that may be employed to provide sufficient power to the remote units 28 under reduced conditions. In this embodiment, more than one power supply 100 is provided. Power from each power supply 100 can be partitioned to only provide power to a subset of the remote units 28. Each power supply 100 provides power to its own dedicated power distribution module 59 which in turn services a subset of the maximum remote units 28 that can be connected to the ICU 34. Providing multiple power supplies 100 also reduce the power output requirements of each power supply 100 over the requirements should a single power supply 100 be employed like provided in the exemplary ICU 34 of FIG. 3. Note that providing more than one power supply 100 is not required. For example, the maximum number of remote units 28 could be reduced to compensate for reduced conditions of the power supply 100 as an alternative. Further, the power requirements of the remote units 28 could be reduced to lower the overall power requirements on the power supply 100 as another alternative.

Figure 7:
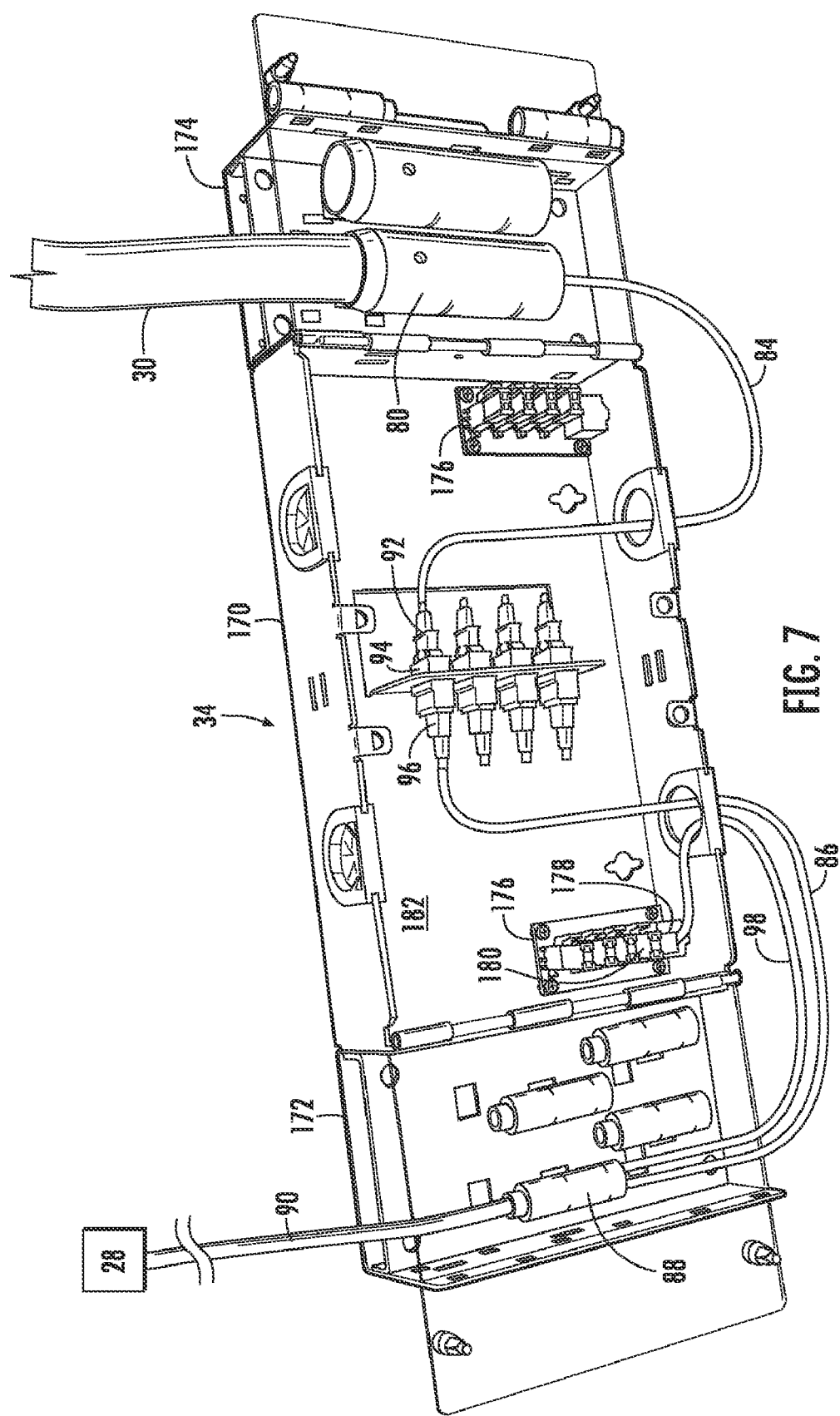
FIG. 7 illustrates an exemplary interconnect unit (ICU) that may be employed in the exemplary Radio-over-Fiber (RoF) distributed communication system of FIGS. 1 and 2.

FIG. 7 illustrates an exemplary ICU 34 that may be employed in the exemplary Radio-over-Fiber (RoF) distributed communication system 10 of FIGS. 1 and 2 and may be configured according to any of the embodiments described above. As illustrated in FIG. 7, the ICU 34 may be provided in an enclosure 170. The enclosure 170 may have side doors 172, 174 that are configured to hold the furcations 88, 80, respectively from the fiber optic cable 90 to the remote unit 28 and the riser cable 30, respectively (see also, FIG. 3). The furcation 80 of the riser cable 30 breaks pairs of optical fibers from the riser cable 30 to provide optical communication input links. The optical communication input links in this embodiment are the downlink and uplink optical fibers 62D, 62U (FIG. 3) to be connected to the remote units 28. In this embodiment, the furcated leg 86 contain twelve (12) optical fibers to provide connections up to six (6) remote units 28 although only one remote unit 28 is illustrated as connected in FIG. 7.

To complete the passive connection of the downlink and uplink optical fibers 62D, 62U to the remote units 28, the furcated legs 84 are connected to furcated legs 86 provided in furcations 88 of fiber optic cables 90 from the remote units 28. The furcated legs 84 are pre-connectorized with the fiber optic connector 92 to facilitate easy connections within the ICU 34. The fiber optic connectors 92 can be connected to the fiber optic adapters 94 which receive the fiber optic connectors 96 from pre-connectorized furcated legs 86 to complete the optical connection between the downlink and uplink optical fibers 62D, 62U in the remote units 28 to the optical fibers 82 in the riser cable 30 from the HEU 20.

The furcations 88 also provide the electrical furcated legs 98 that are configured to receive power from the power supply 100. The electrical furcated legs 98 are electrically coupled to a power terminal 176 contained inside the enclosure of the ICU 34 in this embodiment. The electrical furcated legs 98 may be pre-connectorized with an electrical connector 178 that is configured to connect to an electrical connector 180 in the power terminal 176. A connection (not shown) is made between the power terminal 176 and the power distribution module 59 which receives power from a power supply 100 to provide power to the remote units 28. The power distribution module 59 is not shown in FIG. 7. The power distribution module 59 may be disposed in the enclosure 170 or anywhere else desired on the ICU 34 including but not limited to within a rear wall 182 of the enclosure 170 or on the backside of the rear wall 182 as examples. Further in this embodiment, two power terminals 176 are provided to support all necessary power connections and in the event that more than one power supply 100 is provided to partition power as illustrated and discussed by example in FIG. 6.

The ICU discussed herein can encompass any type of fiber optic equipment and any type of optical connections and receive any number of fiber optic cables or single or multi-fiber cables or connections. The ICU may include fiber optic components such as adapters or connectors to facilitate optical connections. These components can include, but are not limited to the fiber optic component types of LC, SC, ST, LCAPC, SCAPC, MTRJ, and FC. The ICU may be configured to connect to any number of remote units. One or more power supplies either contained with the ICU or associated with the ICU may provide power to the power distribution module in the ICU. The power distribution module can be configured to distribute power to remote units with or without voltage and current protections and/or sensing. The power distribution module contained in the ICU may be modular where it can be removed and services or permanently installed in the ICU.

Further, as used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An interconnect unit for a Radio-over-Fiber (RoF) wireless communication system, comprising:
    a plurality of optical communication links each configured to carry an RoF signal from a head-end unit to a plurality of remote units; and
    at least one power supply electrically coupled to a plurality of power branches each configured to supply power to a remote unit among the plurality of remote units.

2. The interconnect unit of claim 1, wherein each of the plurality of optical communication links comprises:
    an optical communication input link configured to receive the RoF signal from the head-end unit; and
    an optical communication output link optically connected to the optical communication input link and configured to provide an optical connection between the head-end unit and the plurality of remote units.

3. The interconnect unit of claim 1, further comprising a power distribution module electrically coupled between the at least one power supply and the plurality of power branches and configured to distribute power to the plurality of remote units.

4. The interconnect unit of claim 3, wherein the power distribution module comprises a voltage protection circuit.

5. The interconnect unit of claim 4, wherein the voltage protection circuit comprises an over-voltage protection circuit.

6. The interconnect unit of claim 5, wherein the voltage protection circuit further comprises a reverse-voltage protection circuit.

7. The interconnect unit of claim 4, wherein the voltage protection circuit comprises a reverse-voltage protection circuit.

8. The interconnect unit of claim 4, wherein the voltage protection circuit is coupled to a common branch in the power distribution module coupled to the plurality of power branches.

9. The interconnect unit of claim 3, wherein the power distribution module comprises a current protection circuit.

10. The interconnect unit of claim 9, wherein the power distribution module further comprises a voltage protection circuit.

11. The interconnect unit of claim 9, wherein the current protection circuit is comprised of an over-current protection circuit.

12. The interconnect unit of claim 9, wherein the current protection circuit is comprised of a plurality of current protection circuits each coupled to a power branch among the plurality of power branches.

13. The interconnect unit of claim 3, wherein the power distribution module comprises an under-voltage sensing circuit.

14. The interconnect unit of claim 13, wherein the under-voltage sensing circuit is comprised of a plurality of under-voltage sensing circuits each coupled to a power branch among the plurality of power branches.

15. The interconnect unit of claim 14, further comprising a power indicator coupled to the under-voltage sensing circuit and configured to generate a visual indicator when the under-voltage sensing circuit senses an under-voltage.

16. The interconnect unit of claim 1, wherein the at least one power supply comprises at least one Safety Extra Low Voltage (SELV) power supply.

17. The interconnect unit of claim 1, wherein the at least one power supply is comprised a plurality of power supplies each configured to supply power to a different set of remote units among the plurality of remote units.

18. A method of distributing power to a plurality of remote units in a Radio-over-Fiber (RoF) communication system, comprising:
- receiving RoF signals over a plurality of optical communication links in an interconnect unit from a head-end unit;
- providing power from at least one power supply in the interconnect unit to a plurality of power branches;
- distributing the RoF signals from each of the plurality of optical communication links to a remote unit among a plurality of remote units; and
- distributing power from each of the plurality of power branches to a remote unit among the plurality of remote units.

19. The method of claim 18, further comprising protecting the plurality of power branches from an over-voltage condition from the at least one power supply.

20. The method of claim 18, further comprising protecting the plurality of power branches from a reverse-voltage condition from the at least one power supply.

21. The method of claim 18, further comprising protecting the plurality of power branches from an over-current condition from the at least one power supply.

22. The method of claim 18, further comprising sensing an under-voltage condition in each power branch among the plurality of power branches.

23. A Radio-over-Fiber (RoF) wireless communication system, comprising:
- at least one interconnect unit, comprising:
  - a plurality of optical communication links each configured to carry an RoF signal from a head-end unit; and
  - at least one power supply electrically coupled to a plurality of power branches; and
- a plurality of remote units each comprising:
  - a power input port electrically coupled to one of the plurality of power branches; and
  - an optical communication input port optically connected to one of the plurality of optical communication links to receive the RoF signal from the head-end unit.

24. The RoF wireless communication system of claim 23, further comprising a power distribution module electrically coupled between the at least one power supply and the plurality of power branches and configured to distribute power to the plurality of remote units.

25. The RoF wireless communication system of claim 24, wherein the power distribution module comprises either a voltage protection circuit, a current protection circuit, or both a voltage protection circuit and a current protection circuit.

26. The RoF wireless communication system of claim 23, wherein the at least one interconnect unit is comprised of a plurality of interconnect units.

27. The RoF wireless communication system of claim 23, wherein the at least one power supply is comprised of a plurality of power supplies each configured to supply power to a different set of remote units among the plurality of remote units.

28. The RoF wireless communication system of claim 23, wherein each of the plurality of remote units comprises an optical-to-electrical (O-E) converter and an electrical-to-optical (E-O) converter each electrically coupled to the power input port.

29. The RoF wireless communication system of claim 23, wherein:
- the power input port is electrically coupled to one of the plurality of power branches via a fiber optic cable comprising electrical conductors; and
- the optical communication input port is optically connected to one of the plurality of optical communication links via a downlink optical fiber and an uplink optical fiber provided in the fiber optic cable.

* * * * *